No. 818,352. PATENTED APR. 17, 1906.
J. COLDWELL.
LOOM STOPPING MECHANISM.
APPLICATION FILED SEPT. 29, 1903. RENEWED JAN. 16, 1906.

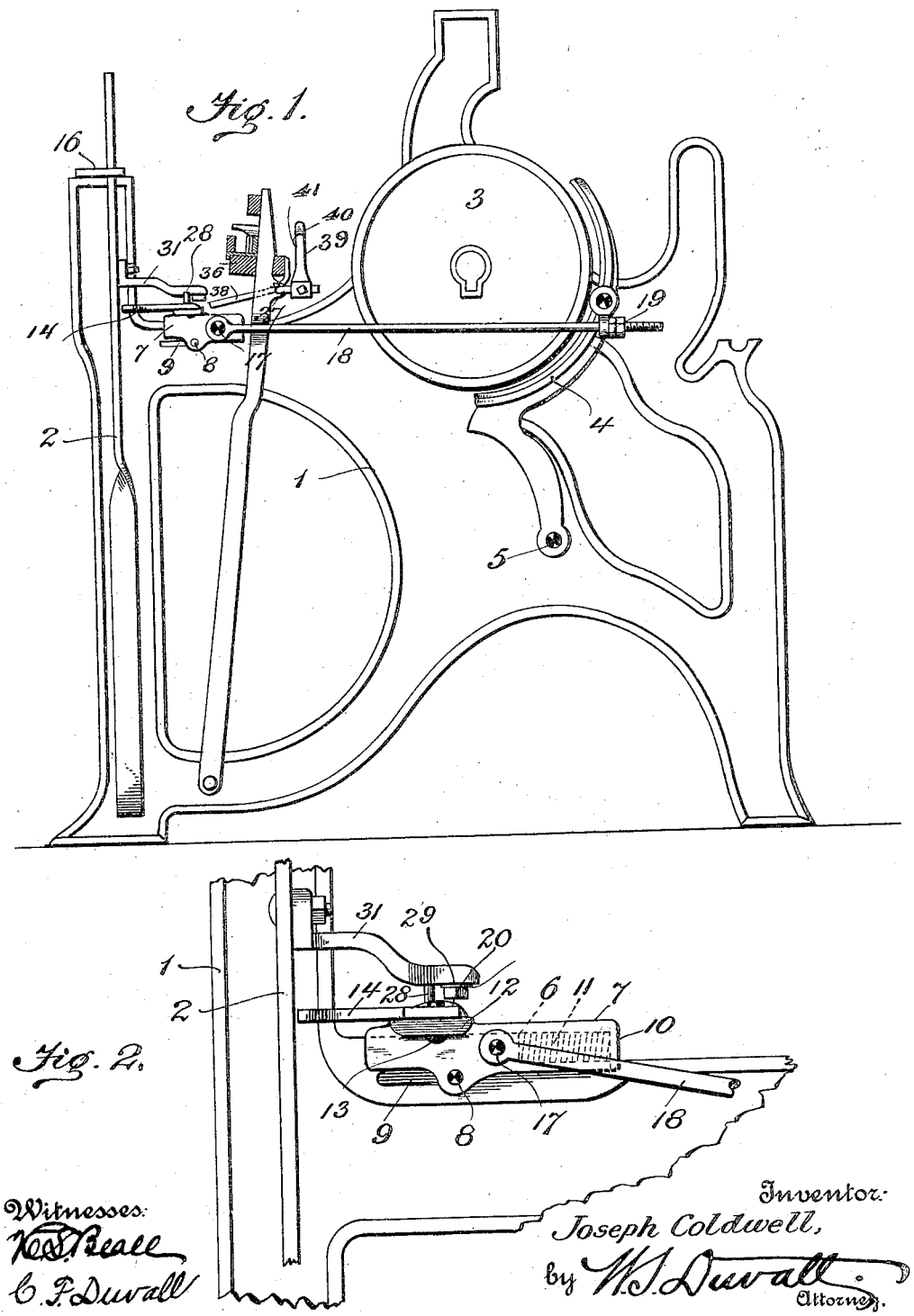

5 SHEETS—SHEET 2.

Witnesses:
W. S. Beall.
C. F. Duvall

Inventor:
Joseph Coldwell,
by W. S. Duvall,
Attorney

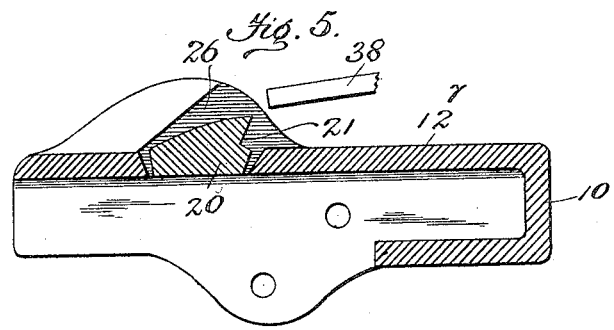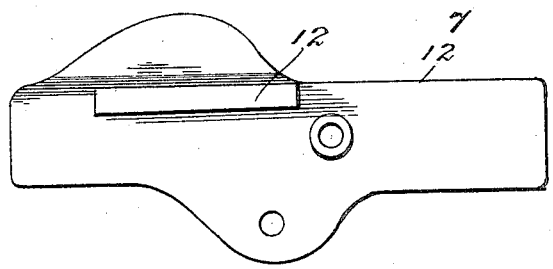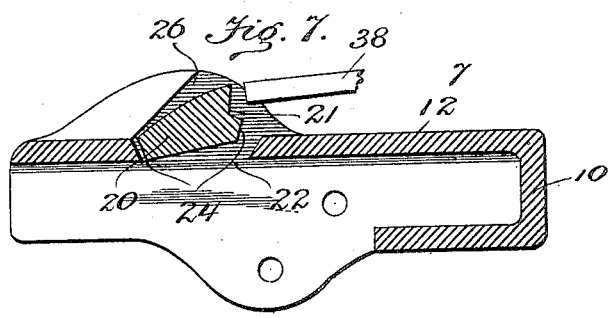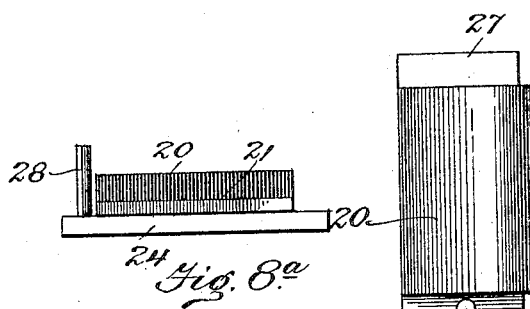

No. 818,352. PATENTED APR. 17, 1906.
J. COLDWELL.
LOOM STOPPING MECHANISM.
APPLICATION FILED SEPT. 29, 1903. RENEWED JAN. 16, 1906.
5 SHEETS—SHEET 4.
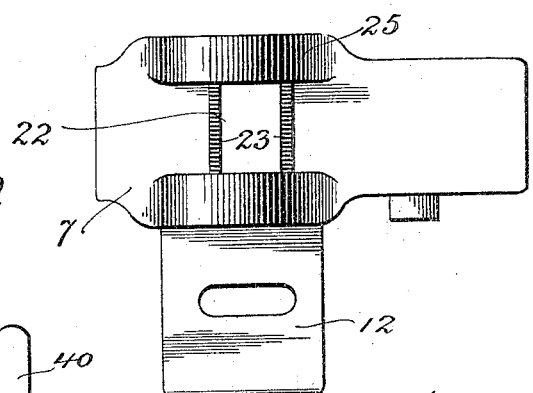
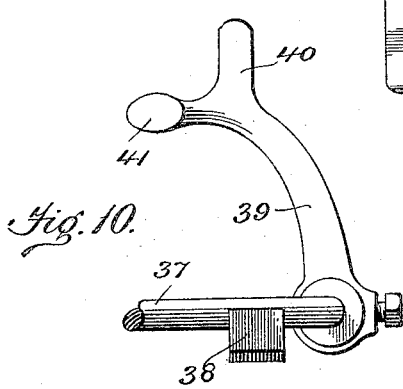
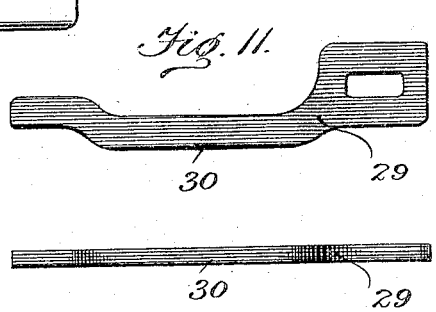
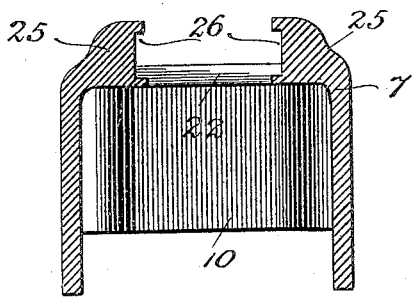
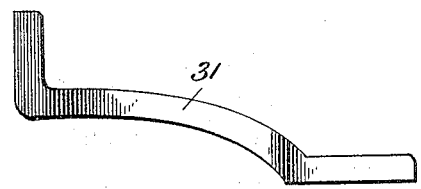
Witnesses:
Inventor:
Joseph Coldwell,
by W. S. Duvall,
Attorney

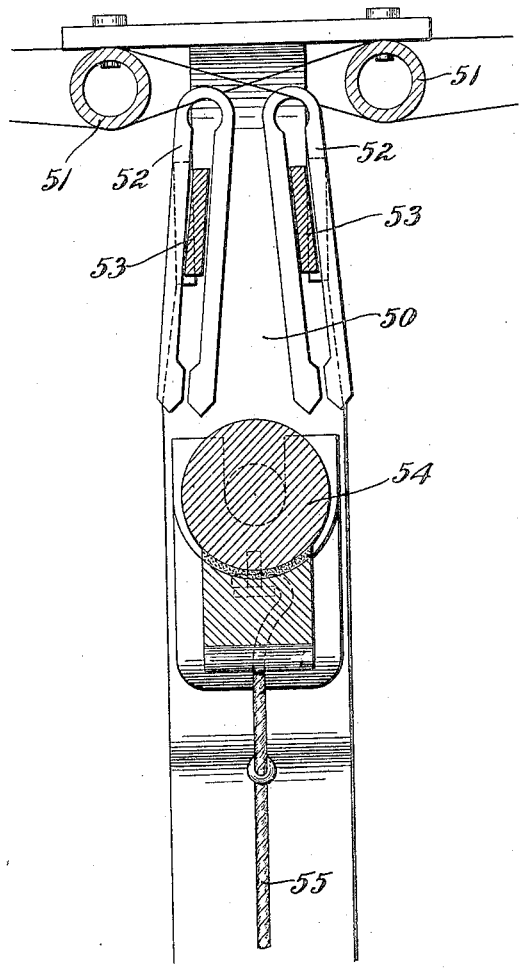
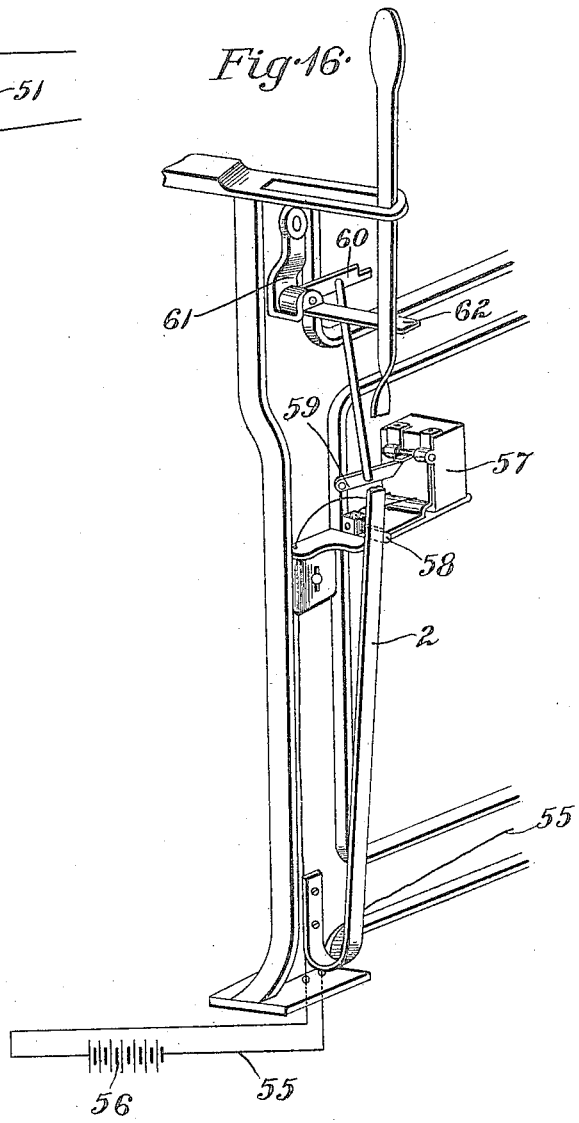

UNITED STATES PATENT OFFICE.

JOSEPH COLDWELL, OF FALL RIVER, MASSACHUSETTS, ASSIGNOR TO JAMES K. LANNING, OF BOSTON, MASSACHUSETTS.

LOOM-STOPPING MECHANISM.

No. 818,352.  Specification of Letters Patent.  Patented April 17, 1906.

Application filed September 29, 1903. Renewed January 16, 1906. Serial No. 296,405.

*To all whom it may concern:*

Be it known that I, JOSEPH COLDWELL, a citizen of the United States, residing at Fall River, in the county of Bristol and State of Massachusetts, have invented a Loom-Stop, of which the following is a specification.

This invention relates to improvements in looms, and more particularly to the means employed for setting the brakes thereof, and, broadly, to the means employed for stopping the loom.

The main object of the invention is the production of a cheap, simple, and effective mechanism for quickly applying the brake to a loom immediately upon the release of the shipper-handle and after the shuttle has been properly boxed, thus preventing the stoppage of the loom while the shuttle is in the shed; furthermore, to enable the employment in such mechanism of shorter daggers, whereby the loom may be run at a greater increased rate of speed, and, broadly, to provide a simple construction whereby the common frog and dagger employed to stop the loom upon the occurrence of a shuttle fault may be given a wider range of action as loom-stopping means.

Other objects and advantages of my invention will hereinafter appear, and the novel features thereof will be particularly described and pointed out in the claims.

Figure 3:
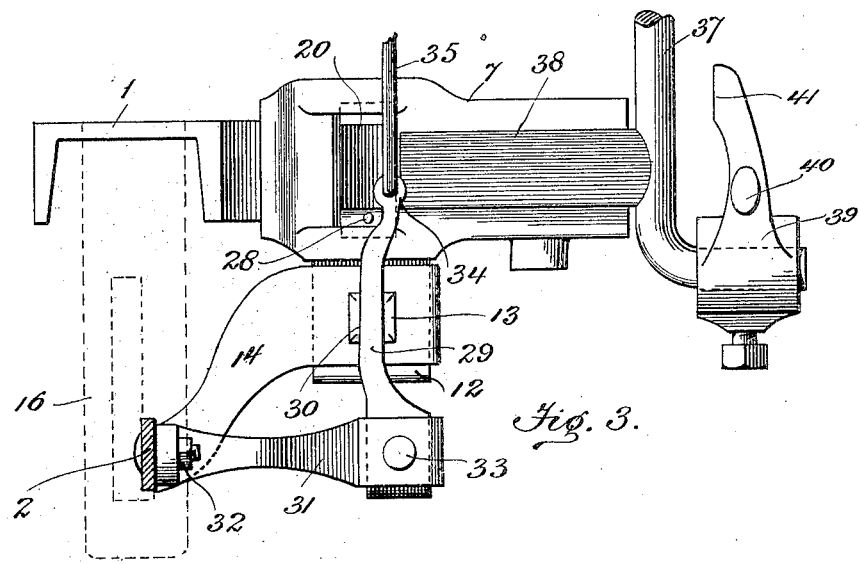
Figure 4:
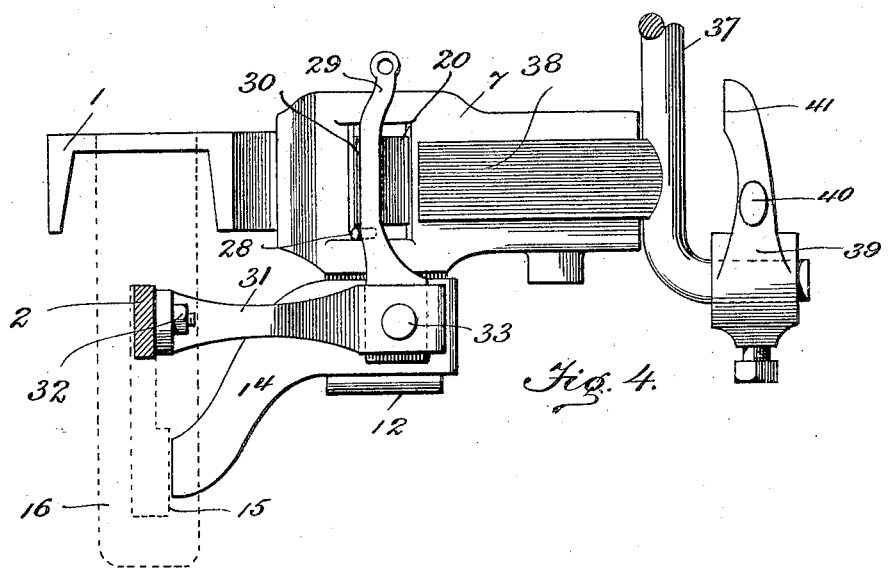

Referring to the drawings, Figure 1 is a side elevation of a loom-frame, showing my invention applied thereto. Fig. 2 is an enlarged view of the invention in side elevation, the frame of the loom being broken away. Fig. 3 is a top plan view of the invention and a portion of the loom, showing the positions of the parts before the release of the shipper-handle. Fig. 4 is a similar view after such release of the shipper-handle. Fig. 5 is a longitudinal sectional view of the frog and plate in detail, the plate being in its inoperative or normal position. Fig. 6 is a side elevation of the frog in detail. Fig. 7 is a view similar to Fig. 5, showing the frog-plate raised to engage the dagger. Fig. 8 is a detail in plan of the frog-plate. Fig. 8ª is a detail in front elevation of the frog-plate. Fig. 9 is a detail in plan of the frog. Fig. 10 is a detail of the dagger and my improved releasing-finger. Figs. 11 and 12 are details in plan and edge elevation of the frog-plate-operating cam-finger. Fig. 13 is a transverse section of the frog, and Fig. 14 is a detail in edge elevation of the arm for carrying the frog-plate-operating cam-finger. Fig. 15 is a longitudinal sectional view through a portion of the loom-frame, showing the contact devices for an ordinary loom stop-motion; and Fig. 16 is a perspective of a portion of the loom-frame, the frog and associated parts being removed for the sake of clearness, but showing electric means actuated by the contact devices for throwing the shipper-handle.

It will be understood at the outset that the hereinafter-described mechanism may be employed at each side of the loom instead of at one side only, and when so duplicated in order that they may move in unison any suitable connecting means may be employed—as, for instance, a connecting-rod, such as hereinafter mentioned. Also it is to be understood that the means employed for operating or releasing the shipper-handle, and hence through it the brake-setting mechanism, may be the hand of the operative, the filling-fork, or any stop-motion adapted therefor, a sample of the latter being shown in United States Patent No. 637,234, granted Coldwell and Gildard, November 21, 1899.

Referring more particularly to Figs. 1 and 2 of the drawings, 1 designates one of the side frames of an ordinary loom, 2 the shipper-handle, and 3 the brake-pulley. In the usual position and pivoted, as at 5, to the frame 1 is the brake 4.

At one or both sides the upper edge of the loom-frame 1 may be formed with a step or shoulder 6, (see dotted lines, Fig. 2,) and upon said frame and extending over the step is a frog 7 of substantially inverted-U shape in cross-section, (see Fig. 13,) and having its depending longitudinal sides embracing the opposite sides of said frame. To guide the frog in its reciprocal movements, a guide-pin 8 may extend transversely thereunder connecting said depending sides and passing through a suitable guide-slot 9, formed in the loom-frame. Between the rear depending end 10 of the frog and the shoulder 6 a coiled spring 11 may be interposed, and thus inclosed by the sides of the frog.

From the frog at its outer side extends a bracket or extension 12, and bolted thereto, as at 13, and extending at a right angle thereto, is a curved bunter 14, terminating adjacent to the shipper-handle when the latter is in engaging position with the notch 15 of the locking-plate 16. (See Figs. 3 and 4.)

A brake-rod 18 is loosely connected by a bolt 17 to the outer side of the frog, and its opposite end is adjustably connected, as at 19, in the usual manner with the brake.

The frog has mounted thereon so as to tilt out of the plane thereof a frog-plate 20. This frog-plate is preferably formed with an upper convexed surface, and at its front or free end with an angular notch 21. Other desired shapes may be given the frog-plate 20, and the same may be mounted in any desired manner on the frog, the only essential being that the same be capable of tilting or disposed out of the plane of its frog. In the present instance the frog, for the accommodation of its frog-plate, is provided with a transverse opening 22, (see Fig. 9,) the opposite edges of which are beveled, as at 23, to correspond somewhat with the beveled edges 24 of the frog-plate, thereby forming seats for the latter. At opposite sides of this opening raised flanges 25 may be formed, the same having recesses 26 formed therein to receive the flat end extensions 27 of the frog-plate, and thereby limit the vertical movement of the frog-plate. Rising from one of the flat end extensions is a trip-pin 28. This tilting member may be in any form desired so long as it is pivotally fastened or otherwise related to the frog or brake-actuating means to be capable of independent movement.

29 designates a cam-shaped trip-finger, which is normally located at one side of and above the frog-plate and frog. This finger is provided with the cam-surface or swell 30 and is carried by the shipper-handle and in such manner as to move therewith and parallel thereto. Such manner may be a bracket-arm 31, bolted, as at 32, to the inner face of the shipper-handle and extending downwardly and rearwardly therefrom and bolted, as at 33, to the outer end of the cam-finger. The inner end of the cam-finger may be provided with an eye 34 (see Fig. 3) or other means for receiving a connecting-rod 35, the opposite end of which latter rod, it will be understood, being connected to the inner or corresponding end of a companion cam-finger (not shown) in instances where the described mechanism is duplicated at the opposite side of the loom.

36 designates the lay, and 37 the protection-rod, from which latter extends the dagger 38, the latter terminating when the rod is in its rearmost position some distance back of the inner end of the frog-plate and over which it (the dagger) readily rides when the frog-plate is in its lowered or inoperative position. The protection-rod has rising therefrom the finger 39, having the upward extension 40, by means of which it and the rod may be readily tilted by the hand of the operator, whereby the dagger may be elevated to a point above the frog-plate, thus disengaging the two when the frog-plate is elevated. The finger is furthermore provided with the front swell 41, which when the shuttle is boxed is thereby operated against to force the finger back, tilt the protection-rod, and thus elevate the dagger, so that under normal conditions the dagger at its free end readily passes over the frog-plate. (See Fig. 5.)

As will appear, the stopping mechanism may be actuated by the hand of the operative disengaging the shipper-handle from the holding-notch or by an automatic release of said lever through the filling-fork or warp stop-motion, the final result being that on the inward travel of said shipper-handle the belt is of course, as is usual, shifted from the fast to the loose pulley, and the cam-finger 29 is moved inward transversely and its cam-surface 30, contacting with the trip-finger 28, elevates into the path of the dagger 38 the free notched end of the frog-plate 20. The dagger advancing with the motion of the lay engages said notched end of the frog-plate, forcing it and its frog 7 forward and through the medium of the brake-rod 18 applying the brake to the fast pulley.

The described mechanism is adapted to act in response to a thread fault when associated with a loom which is provided with any of the usual and ordinary contrivances for effecting the disengagement of the shipper-handle on occurrence of the thread fault. As illustrative of one such device, I have here shown in Figs. 15 and 16 the shipper-actuating mechanism responsive to a break in a warp-thread, such mechanism being of the type disclosed in the aforesaid prior patent, No. 637,234. Referring to Figs. 15 and 16, there are provided upright brackets 50, which sustain the hollow parallel lease-rods 51, by means of which the adjacent threads of the warp are successively crossed. Suspended on each warp-thread is a contact or drop bar 52 in the general shape of an open-ended link, the legs of which embrace an underlying conductor-bar 53. Two sets of drop-bars and two conductor-bars are provided, one for each set of leased threads. When a thread breaks, its contact-bar drops, placing the conductor-bar 53 in electrical contact with the underlying conducting-roller 54, which is also suspended in the brackets 50. The conducting-roller 54 is included in a circuit 55, which also includes a battery 56 (conventionally shown in Fig. 16) and leads to an electromagnet contained within the casing 57, Fig. 16, carried at the side of the loom-frame. The other pole of the magnet is connected to a contact 58, insulated from the frame, but touching the shipper-handle when the latter is operatively positioned and seated in its notch. The contact-bars 53 are electrically connected to the loom-frame and the conducting-roller 54 insulated therefrom, so that the circuit is complete through the loom-frame and the connections described when the shipper-handle is operatively positioned, save where interrupted at the conducting-roller 54. On a break in a warp the circuit is made by the descent of a drop-bar 52 against the conducting-roller, and the magnet thereby energized attracts its pivoted armature-lever 59, which is connected to the overhead gravity-latch 60, causing thereby the elevation of the notched end of the latter into the path of the lay. The latch-lever is pivoted to an L-shaped knock-off lever 61, swingingly mounted on the frame and having a horizontal arm 62, which lies adjacent the shipper. On the occurrence of a break in the warp, therefore, the next forward movement of the lay strikes the then elevated latch-lever 60, forcing the knock-off lever forward and disengaging the shipper-handle from its notch. It is thus apparent that on occurrence of a shuttle fault—that is, if the shuttle is not properly boxed—the dagger and frog mechanism will act in the usual manner to apply the brake through the lowering of the dagger from its normal path and that, furthermore, by the provision of the auxiliary movable means, herein embodied in the movable frog-plate, on the occurrence of a thread fault either in the filling or the warp, as above described, the auxiliary means will act to stop the loom by being lifted into the normal path of the dagger.

With the belt on the loose pulley the strain on the loom will be more greatly reduced, as it has only its own momentum to overcome when the dagger strikes the frog-plate.

When the loom has been stopped by this invention, the shuttle will be in the shuttle-box at its extreme end. Consequently the operative is not required to push the said shuttle to its place before restarting the loom. The loom cannot be stopped under normal conditions with the shuttle in the "shed," and consequently it is next to impossible for a shuttle to "smash" out the warp-threads. This being a fact the loom can be run with a much shorter dagger than heretofore, thus giving more time for the shuttle to pass from one box to the other. The loom being stopped so quickly after the release of the shipper-handle, the usual resulting production of "seconds" from thin places on light or sheer goods is avoided. The spring 11 of course acts as a cushion or buffer against the impact of the dagger against the frog-plate and its frog. By pressing backward upon the extension 40 of the finger 39 the dagger may be at any time raised clear of the frog-plate and enabled to pass thereover. By throwing the shipper-handle again into its locking-notch 15 said handle acting against the curved face of the bunter 14 will return the frog to its retracted normal position and remove the brake from the pulley, so that the loom can be started.

Having described my invention, what I claim as new, and desire to secure by Letters Patent, is—

1. The combination, with a loom, having a brake, of means connected with the brake for applying the same, a dagger for operating such brake-operating means, and mechanism for moving said brake-operating means into the path of the dagger subsequent to a disengagement of the shipper-handle from its holding-notch.

2. The combination with a loom having a brake, of means connected to the brake for applying the same, a dagger for operating such brake-operating means, and a device operated by the shipper-handle for moving said brake-operating means into the path of the dagger when said shipper-handle is disengaged from its holding-notch.

3. The combination with a loom having a brake, of means connected to the brake for applying the same, a movable part of the loom for actuating such brake-applying means, and means for moving the brake-operating means into the path of such movable part of the loom upon the release of the shipper-handle from its holding-notch.

4. The combination with a loom having a brake, of means connected to the brake for applying the same, a dagger carried by the lay and adapted to actuate said means when the latter is advanced into its path, and devices carried by the shipper-handle which upon a release of said handle will serve to advance said brake-applying means.

5. The combination with a loom having a brake, of means connected to the brake for applying the same, a movable part of the loom for actuating such brake-applying means, and means for moving the brake-operating means into the path of such movable part of the loom upon the release of the shipper-handle from its holding-notch, and means for returning said brake-applying means to its normal or inoperative position when said shipper-handle is returned to its holding-notch.

6. The combination with a loom, of a reciprocal frog, a frog-plate therein and adapted to be advanced from the plane of the frog, the brake-rod connected to the frog, a dagger movable with the lay, and devices operated by the shipper-handle for actuating the plate and advancing it into the path of the dagger.

7. The combination with a loom having a brake-bar, of a movable frog, mounted on the frame thereof and pivotally connected with and adapted to actuate the brake-bar, a plate seated upon the frog and normally in line therewith, and means carried by the shipper-handle and adapted when said handle is released from its holding-notch to elevate the plate into the path of the dagger of the loom.

8. The combination with a loom having a brake-rod, of a movable frog pivotally connected to the brake-rod thereof, a plate seated loosely in the frog and normally out of the path of the dagger of the loom, a pin rising from the plate, and a cam moved by the release of the shipper-handle from its holding-notch to operate the pin so as to elevate the plate into the path of the said dagger.

9. The combination with a loom having a brake-rod, of a movable frog pivotally connected to the brake-rod thereof, a plate seated loosely in the frog and normally out of the path of the dagger of the loom, a pin rising from the plate, an arm secured to and projecting from the shipper-handle and a cam-finger extending therefrom, said finger being adapted when the shipper-handle is released to contact with said pin and raise the plate into the path of the dagger.

10. The combination with a loom having a brake-rod, of a movable frog pivotally connected to the brake-rod thereof, a plate seated loosely in the frog and normally out of the path of the dagger of the loom, a projection on the plate, a cam for striking the same and raising the plate, said cam being supported by and movable with the shipper-handle when the latter is released from its holding-notch, and a bunter extending from the frog, and, when the latter is advanced, into the return-path of said shipper-handle.

11. The combination in a loom having a brake-rod, the frame of which is provided with a shoulder, of a frog U-shaped in cross-section mounted movable thereover, a buffer-spring interposed between the shoulder and rear end of the frog, pivotal connection between the frog and the brake-rod of the loom, a plate loosely carried by the frog, and means carried by the shipper-handle for raising the plate into the path of the dagger of the loom when the said shipper-handle is released from its holding-notch.

12. In a loom provided with a vibratory lay, a brake and brake-operating mechanism adapted to be actuated by the moving lay, the combination of movable means normally out of the path of the lay and operatively related to the brake-operating mechanism, and devices adapted upon the occurrence of a thread fault to swing said movable means into the path of the lay.

13. In a loom provided with a vibratory lay, a brake, a sliding frog operatively connected to the brake, and a shuttle-feeler and dagger carried by the lay and adapted upon occurrence of a shuttle fault to cause the dagger to impact upon the frog and stop the loom, the combination of swinging means operatively related to the frog and normally out of the path of the dagger, and devices adapted upon the occurrence of a thread fault to move said swinging means into the path of the dagger.

14. A loom having a vibratory lay, a brake and brake-operating mechanism, a member carried by the lay but movable relatively thereto, a second member normally out of the path of said movable member but adapted to be moved to engage the same, means for moving one of said members into coöperative engagement with the other on the occurrence of a shuttle fault, means to move the other of said members into such coöperative engagement on the occurrence of a thread fault, and means actuated by such engagement for operating the brake.

15. A loom provided with a vibratory lay, a brake and brake-operating mechanism adapted to be actuated through the moving lay, means responsive to a thread fault, for rendering the brake-operating mechanism effectual and means responsive to a shuttle fault also for rendering said brake-operating mechanism effectual.

In testimony whereof I have signed my name to this specification in the presence of two subscribing witnesses.

JOSEPH COLDWELL.

Witnesses:
RICHARD BOARDMAN,
JAMES DUNSE.